US012574365B2

(12) United States Patent
Qiu

(10) Patent No.: US 12,574,365 B2
(45) Date of Patent: Mar. 10, 2026

(54) METHOD, APPARATUS, STORAGE MEDIUM AND ELECTRONIC DEVICE FOR NETWORK AUTHENTICATION

(71) Applicant: Beijing Volcano Engine Technology Co., Ltd., Beijing (CN)

(72) Inventor: Jun Qiu, Beijing (CN)

(73) Assignee: Beijing Volcano Engine Technology Co., Ltd., Beijing (CN)

( * ) Notice: Subject to any disclaimer, the term of this patent is extended or adjusted under 35 U.S.C. 154(b) by 64 days.

(21) Appl. No.: 18/598,654

(22) Filed: Mar. 7, 2024

(65) Prior Publication Data

US 2024/0305625 A1      Sep. 12, 2024

(30) Foreign Application Priority Data

Mar. 7, 2023      (CN) .......................... 202310214966.4

(51) Int. Cl.
*H04L 9/40*          (2022.01)
(52) U.S. Cl.
CPC .......... *H04L 63/083* (2013.01); *H04L 63/101* (2013.01)
(58) Field of Classification Search
CPC ............................ H04L 63/083; H04L 63/101
See application file for complete search history.

(56) References Cited

U.S. PATENT DOCUMENTS 8,832,811 B2 *   9/2014   Horman .................. H04L 63/10
                                                                726/4
9,264,426 B2 *   2/2016   Buer ................... H04L 63/0853

11,063,940 B2 *   7/2021   Hemaraju ............. H04L 63/102
2008/0196089 A1 *   8/2008   Baron ................... H04L 63/083
                                                                726/5
2016/0241542 A1 *   8/2016   Kim ...................... H04L 63/083
(Continued)

FOREIGN PATENT DOCUMENTS

CN          109391601  A      2/2019
CN          110198540  A      9/2019
(Continued)

OTHER PUBLICATIONS

International Search Report received for PCT Patent Application No. PCT/CN2024/080412, mailed on Jun. 4, 2024, 3 pages.

*Primary Examiner* — Oleg Korsak

(57)          ABSTRACT

The present disclosure discloses methods, apparatuses, storage medium and electronic devices for network authentication. A first query request is sent to a background server through an authentication server, network permission information and a second user credential of a target user is sent by the background server to the authentication server in response to the first query request being received, and in the event that an authentication result obtained based on a first user credential and the second user credential characterizes that the authentication is passed, the authentication result and the network permission information are sent to a network device, causing the network device establish a communication connection between the network device and a terminal device. Thus, a network permission of the terminal device can be dynamically assigned based on a scenario in which the terminal device is located, and usage requirements of complex network authorization scenarios can be satisfied.

18 Claims, 8 Drawing Sheets

(56)          References Cited

U.S. PATENT DOCUMENTS

| | | | | |
|---|---|---|---|---|
| 2018/0109517 | A1* | 4/2018 | Fusenig | .................. G06F 21/43 |
| 2020/0252399 | A1* | 8/2020 | Hancock | ............. H04L 63/0823 |
| 2020/0382485 | A1 | 12/2020 | Milton et al. | |
| 2022/0255938 | A1* | 8/2022 | Yang | .................. H04L 41/0843 |

FOREIGN PATENT DOCUMENTS

| | | | |
|---|---|---|---|
| CN | 110912938 A | 3/2020 | |
| CN | 116827586 A | 9/2023 | |

* cited by examiner

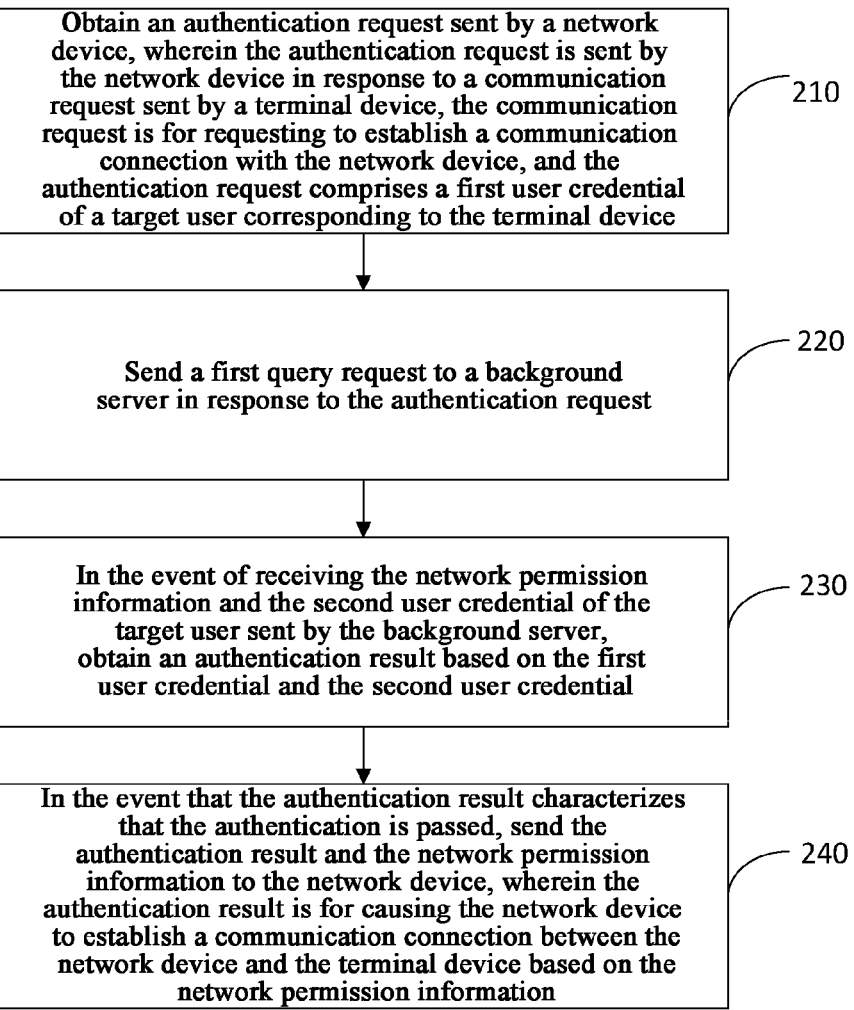

Obtain an authentication request sent by a network device, wherein the authentication request is sent by the network device in response to a communication request sent by a terminal device, the communication request is for requesting to establish a communication connection with the network device, and the authentication request comprises a first user credential of a target user corresponding to the terminal device  ⌐ 210

Send a first query request to a background server in response to the authentication request  ⌐ 220

In the event of receiving the network permission information and the second user credential of the target user sent by the background server, obtain an authentication result based on the first user credential and the second user credential  ⌐ 230

In the event that the authentication result characterizes that the authentication is passed, send the authentication result and the network permission information to the network device, wherein the authentication result is for causing the network device to establish a communication connection between the network device and the terminal device based on the network permission information  ⌐ 240

FIG. 2

Determine a network access scenario of the terminal device based on the serial number of the authentication server and the Internet Protocol address of the network device ⟋510

Obtain the network permission information based on the network access scenario and the user name of the target user ⟋520

US 12,574,365 B2

1

METHOD, APPARATUS, STORAGE MEDIUM
AND ELECTRONIC DEVICE FOR
NETWORK AUTHENTICATION

CROSS-REFERENCE TO RELATED
APPLICATION(S)

This application claims priority to Chinese Application
No. 202310214966.4 filed Mar. 7, 2023, the disclosure of
which is incorporated herein by reference in its entity.

FIELD

The present disclosure relates to the technical field of
computers, and in particular, to methods, apparatuses, stor-
age medium and electronic device for network authentica-
tion.

BACKGROUND

Network access control has become an increasingly
important research direction because it can avoid the secu-
rity problems brought to the overall network due to the risk
of terminal devices. In the related art, network access control
is generally performed through an authentication authoriza-
tion service, whereas the related authentication authorization
service can only provide authentication results of successful
or failed authentication, and the network permissions pro-
vided are also the default network permission configurations
of the authentication authorization service. As the network
usage environment gets increasingly complex, such a single
authentication and authorization service can no longer meet
the needs of enterprises.

SUMMARY

This Summary is provided to introduce concepts in a
simplified form that are further described below in the
Detailed Description. This Summary is not intended to
identify key features or essential features of the technical
solution as defined, nor is it intended to be used to limit the
scope thereof.

In a first aspect, the present disclosure provides a method
for network authentication being applied to an authentica-
tion server, the method comprising:

obtaining an authentication request sent by a network
device, wherein the authentication request is sent by the
network device in response to a communication request
sent by a terminal device, the communication request is
for requesting to establish a communication connection
with the network device, and the authentication request
comprises a first user credential of a target user corre-
sponding to the terminal device;

sending a first query request to a background server in
response to the authentication request, wherein the first
query request is for causing the background server to
determine network permission information and a sec-
ond user credential of the target user;

in the event of receiving the network permission infor-
mation and the second user credential of the target user
sent by the background server, obtaining an authenti-
cation result based on the first user credential and the
second user credential; and in the event that the authentication result characterizes
that the authentication is passed, sending the authenti-
cation result and the network permission information to
the network device, wherein the authentication result is for causing the network device to establish the com-
munication connection between the network device and
the terminal device based on the network permission
information.

In a second aspect, the present disclosure provides a
method for network authentication being applied to a back-
ground server, the method comprising:

receiving a first query request sent by an authentication
server, wherein the first query request is sent by the
authentication server in response to an authentication
request sent by a network device, the authentication
request is sent by the network device to the authenti-
cation server in response to a communication request
sent by a terminal device to the network device, the
communication request is for requesting to establish a
communication connection with the network device,
and the authentication request comprises a first user
credential of a target user corresponding to the terminal
device;

determining network permission information and a sec-
ond user credential of the target user in response to the
first query request; and sending the second user credential and the network per-
mission information to the authentication server,
wherein the second user credential is for causing the
authentication server to obtain an authentication result
based on the first user credential and the second user
credential, and to send the authentication result and the
network permission information to the network device
in the event that the authentication result characterizes
that the authentication is passed, and wherein the
authentication result is for causing the network device
to establish a communication connection between the
network device and the terminal device based on the
network permission information.

In a third aspect, the present disclosure provides an
apparatus for network authentication being applied to an
authentication server, the apparatus comprising:

an obtaining module configured to obtain an authentica-
tion request sent by a network device, wherein the
authentication request is sent by the network device in
response to a communication request sent by a terminal
device, the communication request is for requesting to
establish a communication connection with the net-
work device, and the authentication request comprises
a first user credential of a target user corresponding to
the terminal device;

a first sending module configured to send a first query
request to a background server in response to the
authentication request, wherein the first query request
is for causing the background server to determine
network permission information and a second user
credential of the target user;

a first receiving module configured to obtain an authen-
tication result based on the first user credential and the
second user credential in the event of receiving the
network permission information and the second user
credential of the target user sent by the background
server; and a second sending module configured to send the authen-
tication result and the network permission information
to the network device in the event that the authentica-
tion result characterizes that the authentication is
passed, and wherein the authentication result is for
causing the network device to establish the communication connection between the network device and the terminal device based on the network permission information.

In a fourth aspect, the present disclosure provides an apparatus for network authentication, applied to a background server, the apparatus comprising:

a second receiving module configured to receive a first query request sent by an authentication server, wherein the first query request is sent by the authentication server in response to an authentication request sent by a network device, the authentication request is sent by the network device to the authentication server in response to a communication request sent by a terminal device to the network device, the communication request is for requesting to establish a communication connection with the network device, and the authentication request comprises a first user credential of a target user corresponding to the terminal device;

a determining module configured to determine network permission information and a second user credential of the target user in response to the first query request; and a third sending module configured to send the second user credential and the network permission information to the authentication server, wherein the second user credential is for causing the authentication server to obtain an authentication result based on the first user credential and the second user credential, and to send the authentication result and the network permission information to the network device in the event that the authentication result characterizes that the authentication is passed, and wherein the authentication result is for causing the network device to establish the communication connection between the network device and the terminal device based on the network permission information.

In a fifth aspect, the present disclosure further provides a computer readable storage medium storing a computer program thereon, which, when executed by a processing unit, implements steps of the method in the first aspect or steps of the method in the second aspect.

In a sixth aspect, the present disclosure provides an electronic device, comprising:

a storage unit storing a computer program thereon;

a processing unit for executing the computer program in the storage unit to implement steps of the method in the first aspect or steps of the method in the second aspect.

Other features and advantages of the present disclosure will be explained in detail in the following Detailed Description.

BRIEF DESCRIPTION OF THE DRAWINGS

Through the more detailed description of detailed implementations with reference to the accompanying drawings, the above and other features, advantages and aspects of respective embodiments of the present disclosure will become more apparent. The same or similar reference numerals represent the same or similar elements throughout the figures. It should be understood that the figures are merely schematic, and components and elements are not necessarily drawn scale. In the drawings:

FIG. 2 shows a schematic flowchart of a method for network authentication in accordance with an example embodiment;

DETAILED DESCRIPTION OF EMBODIMENTS

Figure 1:
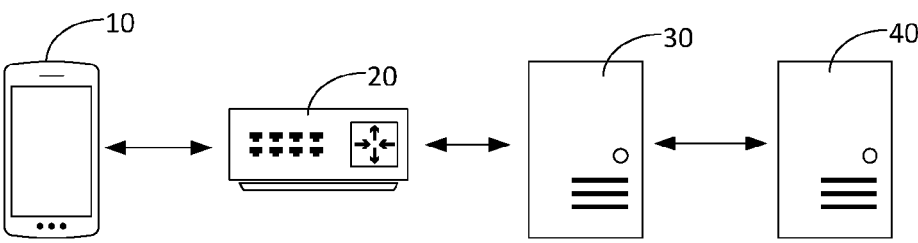
FIG. 1 shows a schematic view of an application scenario of a method for network authentication in accordance with an example embodiment.

The embodiments of the present disclosure will be described in more detail with reference to the accompanying drawings, in which some embodiments of the present disclosure have been illustrated. However, it should be understood that the present disclosure can be implemented in various manners, and thus should not be construed to be limited to embodiments disclosed herein. On the contrary, those embodiments are provided for the thorough and complete understanding of the present disclosure. It should be understood that the drawings and embodiments of the present disclosure are only used for illustration, rather than limiting the protection scope of the present disclosure.

It should be understood that various steps described in method implementations of the present disclosure may be performed in a different order and/or in parallel. In addition, the method implementations may comprise an additional step and/or omit a step which is shown. The scope of the present disclosure is not limited in this regard.

The term "comprise" and its variants used herein are to be read as open terms that mean "include, but is not limited to." The term "based on" is to be read as "based at least in part on." The term "one embodiment" are to be read as "at least one embodiment." The term "another embodiment" is to be read as "at least one other embodiment." The term "some embodiments" are to be read as "at least some embodiments." Other definitions will be presented in the description below.

Note that the concepts "first," "second" and so on mentioned in the present disclosure are only for differentiating different apparatuses, modules or units rather than limiting the order or mutual dependency of functions performed by these apparatuses, modules or units.

Note that the modifications "one" and "a plurality" mentioned in the present disclosure are illustrative rather than limiting, and those skilled in the art should understand that unless otherwise specified, they should be understood as "one or more."

Names of messages or information interacted between a plurality of apparatuses in the implementations of the present disclosure are merely for the illustration purpose, rather than limiting the scope of these messages or information.

It is to be understood that, before applying the technical solutions disclosed in various embodiments of the present disclosure, the user should be informed of the type, scope of use, and use scenario of the personal information involved in the present disclosure in an appropriate manner in accordance with relevant laws and regulations, and user authorization should be obtained.

For example, in response to receiving an active request from the user, prompt information is sent to the user to explicitly inform the user that the requested operation would acquire and use the user's personal information. Therefore, according to the prompt information, the user may decide on his/her own whether to provide the personal information to the software or hardware, such as electronic devices, applications, servers, or storage media that perform operations of the technical solutions of the present disclosure.

As an optional but non-limiting implementation, in response to receiving an active request from the user, the way of sending the prompt information to the user may, for example, include a pop-up window, and the prompt information may be presented in the form of text in the pop-up window. In addition, the pop-up window may also carry a select control for the user to choose to "agree" or "disagree" to provide the personal information to the electronic device.

It is to be understood that the above process of notifying and obtaining the user authorization is only illustrative and does not limit the implementations of the present disclosure. Other methods that satisfy relevant laws and regulations are also applicable to the implementations of the present disclosure.

Meanwhile, it is to be understood that data involved in the present technical solution (including but not limited to the data itself, the acquisition or use of the data) should comply with requirements of corresponding laws and regulations and relevant rules.

FIG. 1 shows a schematic view of an application scenario of a method for network authentication according to an example embodiment. As shown in FIG. 1, the method for network authentication provided in this embodiment of the present disclosure is applicable to the application scenario shown in FIG. 1. The application scenario includes a terminal device 10, a network device 20, an authentication server 30 and a background server 40, among which the terminal device 10 is communicatively connected to the network device 20, the network device 20 is communicatively connected to the authentication server 30, and the authentication server 30 is communicatively connected to the background server 40. It should be understood that the communication connection may refer to data interaction by way of a wired or wireless connection.

The terminal device 10 may send to the network device 20 a communication request for requesting to establish a communication connection, wherein the communication connection comprises a first user credential of a target user. The network device 20, after receiving the communication request, sends the communication request to the authentication server 30, and in response to the communication request, the authentication server 30 sends a first query request to the background server 40. In response to the first query request, the background server 40 sends network permission information and a second user credential of the target user to the authentication server 30. Then, the authentication server 30 determines an authentication result based on the first user credential and the second user credential and in the event that the authentication result characterizes that the authentication is passed, sends the authentication result and the network permission information to the network device 20. After receiving the authentication result and the network permission information, the network device 20 establishes the communication connection between the network device 20 and the terminal device 10 based on the network permission information.

It is to be noted that the terminal device 10 may be a mobile terminal such as a mobile phone, a notebook computer, a digital broadcast receiver, a PDA (personal digital assistant), a PAD (portable Android device), a PMP (portable multimedia player), an on-board terminal (e.g., an on-board navigation terminal) and the like, or a fixed terminal such as digital TV, a desktop computer and the like; the network device 20 may be a wireless controller, a switch, etc., and the network device 20 and the terminal device 10 may communicate with each other using the EAPol protocol. The authentication server 30 may be a server for deploying a network authentication service, which may be a RADIUS service. The authentication server 30 and the network device 20 may communicate with each other using the RADIUS protocol. The background server 40, as a server for authorizing a network permission to the terminal device 10, is for storing network permission information and second user credentials of different users, and the background server 40 and the authentication server 30 may communicate with each other using the HTTP protocol.

The method for network authentication provided in this embodiment of the present disclosure will be illustrated in detail with reference to the drawings.

FIG. 2 shows a flowchart of a method for network authentication in accordance with an example embodiment. As shown in FIG. 2, the method for network authentication provided in the embodiment of the present disclosure may be applied to the authentication server 30 in FIG. 1. As shown in FIG. 2, the method for network authentication may comprise the following:

In step 210, an authentication request sent by a network device is obtained, wherein the authentication request is sent by the network device in response to a communication request sent by a terminal device, and the communication request is for requesting to establish a communication connection with the network device, and the authentication request comprises a first user credential of a target user corresponding to the terminal device.

Herein, an authentication server receives an authentication request sent by the network device, wherein the authentication request may comprise the first user credential of the target user. The terminal device may send, to the network device, a communication request for requesting to establish a communication connection, which comprises the first user credential of the target user. In response to the communication request, the network device sends the authentication request to the authentication server. Alternatively, the authentication request may also be understood as a communication request sent by the terminal device. The network device receives the communication request sent by the terminal device, and obtains the first user credential of the target user and relays the first user credential to the authentication server in the form of an authentication request.

As an example, the terminal device may be connected to a network interface of the network device, input the first user credential of the target user through a client deployed on the terminal device, and subsequently send the first user credential of the target user to the network device in the form of a communication request by the EAPol protocol. The network device receives, through the network interface, the communication request sent by the terminal device and sends the first user credential of the target user to the authentication server in the form of an authentication request.

It is to be understood that the first user credential may comprise a user name and password of the target user. For different users, their user names may be different.

In step 220, a first query request is sent to a background server in response to the authentication request.

Herein, the authentication server, after receiving the authentication request sent by the network device, sends a first query request to a background server in response to the authentication request. The first query request is for causing the background server to determine network permission information and a second user credential of the target user.

In step 230, in the event of receiving the network permission information and the second user credential of the target user sent by the background server, an authentication result is obtained based on the first user credential and the second user credential.

Herein, the authentication server receives the network permission information and the second user credential of the target user sent by the background server, wherein the network permission information and the second user credential of the target user are sent by the background server to the authentication server in response to the first query request.

It is to be understood that the second user credential comprises a user name and a password of the target user, and the network permission information is for instructing the network device to communicate with the terminal device based on a network resource indicated by the network permission information. The network resource comprises VLAN (virtual local area network), ACL (access control list), Role (role-based access control, which is a basic element in the model), etc.

In the case that the network permission information comprises a VLAN code, it indicates that the network device applies the target user connection under the VLAN corresponding to the VLAN code. For example, the network permission information may comprise such authorization content as "Tunnel-Type: VLAN, Tunnel-Medium-Type: IEEE-802, Tunnel-Private-Group::100". The network device, after obtaining the network permission information, assigns the target user to the virtual local area network of VLAN100.

In the case that the network permission information comprises an ACL code, it indicates that the network device applies the ACL rule corresponding to the ACL code to a session of the target user. For example, the network permission information may comprise such authorization content as "Filter-id:3000". The network device, after obtaining the network permission information, applies the session of the target user to the 3000ACL rule.

In the case that the network permission information comprises Role, it indicates that the network device configures a user role/user group for the session of the target user. For example, the network permission information may comprise such authorization content as "Filter-id:dev". The network device, after obtaining the network permission information, applies the session of the target user to the predefined dev's role.

It is to be noted that when the terminal device is in different network access scenarios, corresponding network permission information may be different.

The authentication server may obtain an authentication result by comparing whether the user name and password in the first user credential are consistent with those in the second user credential. In the event that the user names and the passwords are consistent, it characterizes that the authentication is passed. In the event that the user names and the passwords are not consistent, it characterizes that the authentication is not passed.

In step 240, in the event that the authentication result characterizes that the authentication is passed, the authentication request and the network permission information are sent to the network device, wherein the authentication result is for causing the network device to establish the communication connection between the network device and the terminal device based on the network permission information.

Herein, in the event that the authentication result obtained by the authentication server characterizes that the authentication is passed, the authentication server sends the authentication result characterizing that the authentication is passed and the network permission information to the network device, so as to cause the network device establish the communication connection between the network device and the terminal device based on the network permission information.

Alternatively, in other embodiments, in the event that the authentication result characterizes that the authentication is not passed, the authentication server may send the authentication result characterizing that the authentication is not passed to the network device, so as to cause the network device reject the terminal device to access to the network device in response to the authentication result.

Thus, by sending the first query request to the background server, and receiving the network permission information and the second user credential of the target user sent by the background server to the authentication server in response to the first query request, and in the event that the authentication result obtained based on the first user credential and the second user credential characterizes that the authentication is passed, sending the authentication result and the network permission information to the network device so as to cause the network device to establish a communication connection between the network device and the terminal device based on the network permission information, a network permission of the terminal device can be dynamically assigned based on a scenario in which the terminal device is located, and usage requirements of complex network authorization scenarios can be satisfied.

In some feasible implementations, the first query request may comprise a user name of the target user, a serial number of the authentication server and an Internet Protocol address of the network device.

Herein, the first query request may carry a user name of the target user, a serial number of the authentication server and an Internet Protocol (IP) address of the network device. The user name of the target user may be obtained from the first user credential. For different authentication servers, they may have overall network unique serial numbers that are for distinguishing different authentication servers in the overall network.

It is to be noted that the serial number of the authentication server and the Internet Protocol address of the network device are for the background server to determine a network access scenario of the terminal device based on the serial number and the Internet Protocol address. The user name of the target user and the network access scenario are for the background server to determine the network permission information based on the user name and the target user and the network access scenario, and the user name of the target user is for the background server to determine the second user credential of the target user. For example, in the event that the network access scenario characterizes that virtual local area network resources are used for network accessing, the background server determines a target virtual local area network to be assigned to the target user based on the user name of the target user.

Of course, the first query request may further comprise other information, such as a MAC (Media Access Control) address of the terminal device, an IP address of the terminal device and the so on. It is to be noted that information carried by the first query request is mainly for the background server to locate the network permission information and the second user credential of the target user based on the information carried by the first query request.

Thus, by carrying the user name of the target user, the serial number of the authentication server and the Internet Protocol address of the network device in the first query request, the background server can be caused to accurately determine the network permission information of the network access scenario that is suitable for the terminal device based on the user name of the target user, the serial number of the authentication server and the Internet Protocol address of the network device.

Figure 3:
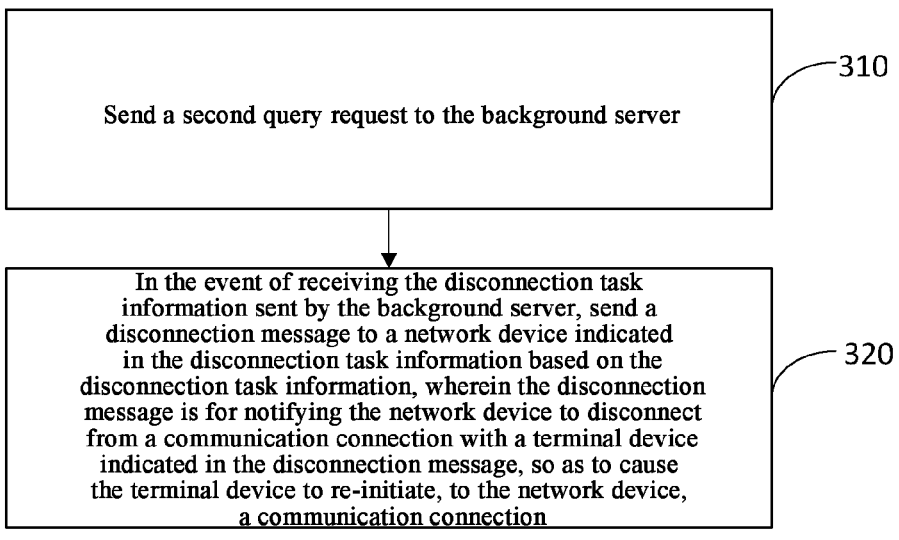
FIG. 3 shows a schematic flowchart of a method for network authentication in accordance with another example embodiment.

FIG. 3 shows a schematic flowchart of a method for network authentication in accordance with another example embodiment. As shown in FIG. 3, the method for network authentication provided in the embodiment of the present disclosure may further comprise the following:

in step 310, a second query request is sent to the background server.

Herein, the authentication server may regularly send a second query request to the background server. As an example, a timing task may be established in the authentication server, which triggers the sending of the second query request to the background server at every interval of a predetermined time interval. Of course, the second query request may also be generated in other manners. For example, the network device may regularly send a permission request to the authentication server, which is for instructing the authentication server to query whether a network permission of the target user changes. In response to the permission request, the authentication server may generate a second query request.

It should be understood that the authentication server may start to regularly send the second query request to the background server after performing steps 210 to 240. That is, after the terminal device establishes a communication connection with the network device, the authentication server may regularly send the second query request to the background server.

The second query request is for causing the background server to send disconnection task information to the authentication server in response to the second query request, and the disconnection task information is generated by the background server in the event of detecting a change in a network permission of the target user.

It is to be noted that the background server may detect whether the network permission information of a user corresponding to the terminal device connected with the network device changes, and in the event of detecting the change in the network permission information of a certain user, the background server generates disconnection task information. The disconnection task information is for instructing a target network device to disconnect from communication between the target network device and a target terminal device. The disconnection task information may comprise a network connection identifier and a NAS (network access server) identifier of the network device. The network connection identifier may comprise Called-Station-Id, UserName, Calling-Station-Id, Acct-Session-Id (indicating a security identifier for a billing), etc., among which Calling-Station-Id and Acct-Session-Id may be used to identify unique attributes of a terminal device.

It should be understood that the disconnection task information may be represented as an array of character strings in Json format. The authentication server obtains the disconnection task information by receiving a message from the background server in the form of an array of character strings in Json format through an interface.

In step 320, in the event of receiving the disconnection task information sent by the background server, a disconnection message is sent to a network device indicated in the disconnection task information based on the disconnection task information, wherein the disconnection message is for notifying the network device to disconnect from a communication connection with a terminal device indicated in the disconnection message, so as to cause the terminal device re-initiate, to the network device, the communication connection.

Herein, the authentication server, after receiving the disconnection task information sent by the background server, constructs a disconnection message based on the disconnection task information and sends the disconnection message to a network device indicated in the disconnection task information. For example, if a NAS identifier of a network device is included in the disconnection task information, then the NAS identifier of the network device is the network device indicated in the disconnection task information.

The disconnection message sent by the authentication server to the network device is for notifying the network device to disconnect from a communication connection with a terminal device indicated in the disconnection message, so as to cause the terminal device re-initiate, to the network device, the communication connection. It is to be noted that the terminal device re-initiating a communication connection to the network device refers to the terminal device re-sending a communication request to the network device.

It is to be noted that the change in the network permission is actually implemented using a DMs (Disconnect Messages) service. DMs may notify the network device that a network permission of a target terminal device expires, and thus to disconnect a current connection of the target terminal device, such that the target terminal device may be re-connected and a new network permission may take effect. By using DMs, not only the network permission of the terminal device but also the network can be refreshed. Moreover, since the terminal device has recorded the first user credential, it can be automatically connected after being disconnected from a network connection, without the need to concern that DMs prevents a re-connection.

Thus, by receiving the disconnection task information sent by the background server in response to the second query request, and sending a disconnection message to a network device indicated in the disconnection task information based on the disconnection task information, so as to cause the network device disconnect from a communication connection with a terminal device indicated in the disconnection message and to cause the terminal device re-initiate, to the network device, the communication connection, the refresh of the network permission of the terminal device can be actively implemented, and the switch of the network permission is senseless to users. When the network permission of the target user changes, the network no longer passively waits for the target user to reconnect to cause the latest network permission to take effect, but actively updates the network permission of the target user.

In some feasible implementations, after step 330, the authentication server may further send a disconnection result to the background server in the event of receiving the disconnection result sent by the network device in response to the disconnection message.

Wherein, the disconnection result is for characterizing whether the network device successfully disconnects from a communication connection with the terminal device, and in the event that the disconnection result characterizes that the network device successfully disconnects from the communication connection with the terminal device, causing the background server to stop sending the disconnection task information to the authentication server. In the event that the disconnection result characterizes that the network devices fails to successfully disconnect from the communication connection with the terminal device, causing the background server to continuously send the disconnection task information to the authentication server until preset sending times are reached or the network device successfully disconnects from the communication connection with the terminal device.

Herein, the authentication server may further receive a disconnection result sent by the network device in response to the disconnection message. The network device, in response to the disconnection message, performs the act of disconnecting a connection between the terminal device and the network device to obtain a disconnection result. The disconnection result is for characterizing whether the network device successfully disconnects from a communication connection with the terminal device. Further, the network device feeds the disconnection result back to the authentication server through the interface.

As an example, the disconnection result may be represented in the form of ACK (Acknowledge character) or NAK (Negative Acknowledgment)+error code.

The authentication server, after receiving the disconnection result sent by the network device, forwards the disconnection result to the background server. After the background sever receives the disconnection result, in the event that the disconnection result characterizes that the network device successfully disconnects from the communication connection with the terminal device, the background server stops sending the disconnection task information to the authentication server. In the event that the disconnection result characterizes that the network devices fails to successfully disconnect from the communication connection with the terminal device, the background server continuously sends the disconnection task information to the authentication server until preset sending times are reached or the network device successfully disconnects from the communication connection with the terminal device.

As an example, preset sending times may be three times. When the authentication server sends the disconnection task information for three times, the background server stops sending the disconnection task information to the authentication server, regardless of whether receiving the disconnection result that the network device has successfully disconnected from a communication connection with the terminal device.

Thus, by feeding back the disconnection result to the background server, it is possible to cause the background server perceive whether the terminal device has been disconnected, so as to ensure that the network permission of the terminal device can be refreshed in time when the network permission of the terminal device changes.

Figure 4:
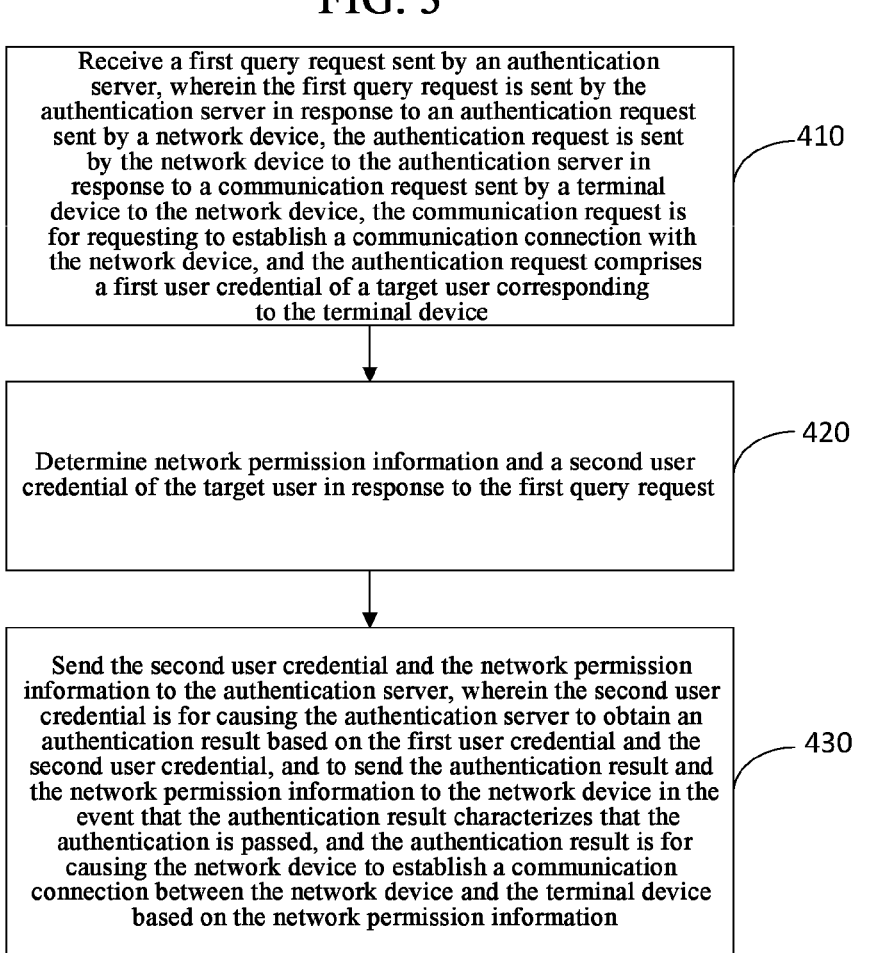
FIG. 4 shows a schematic flowchart of a method for network authentication in accordance with a further example embodiment.

FIG. 4 shows a schematic flowchart of a method for network authentication according to another example embodiment. As shown in FIG. 4, the method for network authentication provided in the embodiment of the present disclosure may be applied to the background server 40 shown in FIG. 1. As shown in FIG. 4, the method for network authentication may comprise the following:

In step 410, a first query request sent by an authentication server is received, wherein the first query request is sent by the authentication server in response to an authentication request sent by a network device, and the authentication request is sent by the network device to the authentication server in response to a communication request sent by a terminal device to the network device. The communication request is for requesting to establish a communication connection with the network device, and the authentication request comprises a first user credential of a target user corresponding to the terminal device.

Herein, the background server receives a first query request sent by an authentication server, the first query request being for requesting network permission information and a second user credential of a target user. A terminal device may send to a network device a communication request for requesting to establish a communication request, which comprises a first user credential of the target user. The network device, in response to the communication request, sends an authentication request to the authentication server, which may comprise the first user credential of the target user. Further, the authentication server, in response to the authentication request, sends the first query request to the background server.

In step 420, network permission information and a second user credential of the target user are determined in response to the first query request.

Herein, the background server, in response to the first query request, determines the network permission information and the second user credential of the target user based on information carried in the first query request.

In step 430, the second user credential and the network permission information are sent to the authentication server, wherein the second user credential is for causing the authentication server to obtain an authentication result based on the first user credential and the second user credential, and to send the authentication result and the network permission information to the network device in the event that the authentication result characterizes that the authentication is passed, and the authentication result is for causing the network device to establish a communication connection between the network device and the terminal device based on the network permission information.

Herein, the background server, after determining network permission information and a second user credential of the target user, sends the network permission information and the second user credential to the authentication server. The second user credential is for causing the authentication server to obtain an authentication result based on the first user credential and the second user credential, and to send the authentication result and the network permission information to the network device in the event that the authentication result characterizes that the authentication is passed, and the authentication result is for causing the network device to establish a communication connection between the network device and the terminal device based on the network permission information.

Wherein, the authentication server may obtain an authentication result by comparing whether the user name and password in the first user credential are consistent with those in the second user credential. In the event that the user names and the passwords are consistent, it characterizes that the authentication is passed. In the event that the user names and the passwords are not consistent, it characterizes that the authentication is not passed. In the event that the authentication result obtained by the authentication server characterizes that the authentication is passed, the authentication server sends the authentication result characterizing that the authentication is passed and the network permission information to the network device, so as to cause the network device establish the communication connection between the network device and the terminal device based on the network permission information. In the event that the authentication result characterizes that the authentication is not passed, the authentication server may send the authentication result characterizing that the authentication is not passed to the network device, so as to cause the network device reject the terminal device to access the network device in response to the authentication result.

It is to be noted that the background server may store second user credentials of different users and corresponding network permission information. The network administrator may adjust the network permission information of users in the background server.

Thus, by receiving the first query request sent by the authentication server, and determining the network permission information and the second user credential of the target user in response to the first query request, and sending the network permission information and the second user credential to the authentication server so as to cause the network device establish the communication connection between the network device and the terminal device based on the network permission information, a network permission of the terminal device can be dynamically assigned based on a scenario in which the terminal device is located, and usage requirements of complex network authorization scenarios can be satisfied.

In some feasible implementations, the first query request may comprise a user name of the target user, a serial number of the authentication server and an Internet Protocol address of the network device. It is to be understood that the information carried in the first query request has been described in detail in the portion about the authentication server in the foregoing embodiments and will not be repeated herein.

Figure 5:
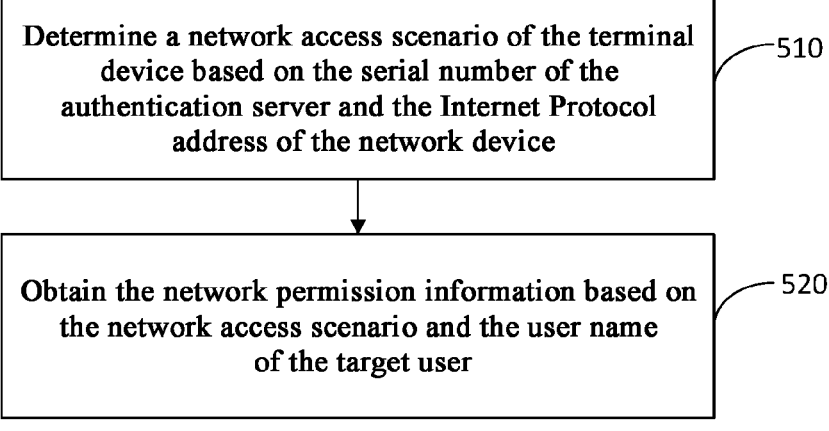
FIG. 5 shows a schematic flowchart of determining network permission information in accordance with an example embodiment.

FIG. 5 shows a schematic flowchart of determining network permission information according to an example embodiment. As shown in FIG. 5, the network permission information may be obtained by the following:

In step 510, a network access scenario of the terminal device is determined based on the serial number of the authentication server and the Internet Protocol address of the network device.

Herein, the first query request carries a user name of a target user, a serial number of the authentication server and an Internet Protocol address of the network device. The background server, in response to the first query request, determines a network access scenario of the terminal device based on the serial number of the authentication server and the Internet Protocol address of the network device. The network access scenario is for representing a network environment in which the terminal device is located. When the terminal device is located in different working areas, corresponding network access scenarios of the terminal device will be different due to different network environments in these working areas.

In some embodiments, the network access scenario of the terminal device may be determined based on a mapping relationship between the serial number of the authentication server, the Internet Protocol address of the network device and different types of network access scenarios.

It is to be noted that the serial number of the authentication server can be used to distinguish between different authentication servers, and different authentication servers can be deployed with different RADIUS services. The Internet Protocol address of the network device can then be used to determine the type of network device.

In step 520, the network permission information is obtained according to the network access scenario and the user name of the target user.

Herein, for different network access scenarios, network resources which can be provided by network devices under these network access scenarios may be different. For example, network resources may comprise VLAN, ACL, Role, etc. Through the network access scenario, the network resources which may be provided by the corresponding network device can be determined, and then specific network resources may be assigned to the terminal device based on the user name. For example, in the event that the network access scenario characterizes that the terminal device uses virtual local area network resources provided by the network device for network accessing, the background server determines a target virtual local area network to be assigned to the target user based on the user name of the target user.

Thus, the network access scenario of the terminal device may be accurately determined in a complex network environment through the serial number of the authentication server and the Internet Protocol address of the network device, and a matching network permission may be assigned to different users under different network access scenarios based on the user name and the network access scenario, thereby realizing dynamic assignment of a network permission based on a role attribute of the target user.

In some feasible implementations, step 520 may comprise: in the event that the network access scenario characterizes that virtual local area network resources are for network accessing, determining a target virtual local area network to be assigned to the target user based on the user name of the target user; and obtaining the network permission information based on the target virtual local area network.

Herein, in the event that the network access scenario characterizes that the terminal device uses virtual local area network resources provided by the network device for network accessing, the background server determines a target virtual local area network to be assigned to the target user based on the user name of the target user.

The target virtual local area network may refer to a specified VLAN in a VLAN pool which is assigned by the background server for the terminal device.

In some embodiments, a hash value corresponding to the user name may be determined based on the user name of the target user, and the target virtual local area network may be obtained by determining, based on the hash value, a virtual local area network in a pool of virtual local area networks which matches the hash value.

The hash value corresponding to the user name may be obtained by performing a hash calculation on the user name. As an example, the hash value may be obtained by performing a calculation on the user name using the FNV hash algorithm. It is to be noted that a modulo operation may be performed on the hash value to convert the hash value of the user name to an integer value in the range of the interval 1-100.

The pool of virtual local area networks comprises a plurality of virtual local area networks and a range of hash value intervals corresponding to a virtual local area network of the virtual local area networks, and a size of the range of hash value intervals corresponding to the virtual local area network is determined based on a weight which the virtual local area network occupies in the pool of virtual local area networks.

For example, the pool of virtual local area networks comprises VLAN1, VLAN2 and VLAN3. Respective weights which VLAN1, VLAN2 and VLAN3 occupy in the pool of virtual local area networks are 1:2:2, and the range of intervals is 1-100. Then, ranges of hash value intervals corresponding to VLAN1, VLAN2 and VLAN3 are VLAN1=[1,20], VLAN2=[21,60], and VLAN3=[61,100] respectively. When the hash value corresponding to the user name is 70, the target virtual local area network is VLAN3.

Wherein, the weight which the virtual local area network occupies in the pool of virtual local area networks may be determined based on communication capacity which the virtual local area network can provide. The greater the weight of a virtual local area network with greater communication capacity, the more times that the virtual local area network will be assigned to the terminal device.

It is to be noted that the distribution interval of the hash value corresponding to the user name determines the target virtual local area network used by the terminal device. Since the hash algorithm is random, the mapping of the hash value corresponding to the user name to the range of hash value intervals is also random, and conforming to a normal distribution. As a result, each VLAN in the pool of virtual local area networks is assigned an even number of times, which will not cause excessive congestion on a particular VLAN. Moreover, since the hash value corresponding to the user name is fixed, the VLAN assigned to the target user can also be kept stable, and thus avoiding frequent network switching of the terminal device during roaming.

The background server may construct the network permission information based on the target virtual local area network. For example, the network permission information may be "Tunnel-Type: VLAN, Tunnel-Medium-Type: IEEE-802, Tunnel-Private-Group::100", which indicates that the target user is to be assigned to the virtual local area network of VLAN100.

Thus, the network access scenario of the terminal device may be accurately determined in a complex network environment through the serial number of the authentication server and the Internet Protocol address of the network device, and a matching network permission may be assigned to different users under different network access scenarios based on the user name and the network access scenario, thereby realizing dynamic assignment of a network permission based on a role attribute of the target user. Moreover, by using the foregoing pool of virtual local area networks, the assignment and authorization of a plurality of VLANs can be realized, avoiding any impact on the existing network.

In some feasible implementations, the background server may further send disconnection task information to the authentication server in response to a second query request sent by the authentication server, wherein the disconnection task information is generated by the background server in the event of detecting the change in a network permission of the target user, and the disconnection task information is for causing the authentication server send a disconnection message to a network device indicated in the disconnection task information based on the disconnection task information, and the disconnection message is for notifying the network device to disconnect from a communication connection with a terminal device indicated in the disconnection message, so as to cause the terminal device re-initiate, to the network device, the communication connection.

Herein, the illustration on how the background server sends the disconnection task information to the authentication server in response to the second query request sent by the authentication server, as well as the disconnection task information may be referred to the relevant descriptions of the foregoing embodiments and will not be repeated herein.

Thus, by sending the disconnection task information, the background server can actively realize the refresh of a network permission of the terminal device, and the switch of the network permission is senseless to users. When the network permission of the target user changes, the network no longer passively waits for the target user to reconnect to cause the latest network permission to take effect, but actively updates the network permission of the target user.

In some feasible implementations, the background server may further receive a disconnection result sent by the authentication server, wherein the disconnection message is sent by the network device to the authentication server in response to the disconnection message, the disconnection result is for characterizing whether the network device successfully disconnects from a communication connection with the terminal device. In response to the disconnection result, in the event that the disconnection result characterizes that the network device successfully disconnects from the communication connection with the terminal device, the background server stops sending the disconnection task information to the authentication server, and in the event that the disconnection result characterizes that the network devices fails to successfully disconnect from the communication connection with the terminal device, continuously sends the disconnection task information to the authentication server until preset sending times are reached or the network device successfully disconnects from the communication connection with the terminal device.

Herein, the illustration on the principle of sending the disconnection result and the operation performed by the background server in response to the disconnection result can be referred to the related illustration in the foregoing embodiments and will not be repeated herein.

Thus, by receiving the disconnection result, it is possible to cause the background server perceive whether the terminal device has been disconnected, so as to ensure that the network permission of the terminal device can be refreshed in time when the network permission of the terminal device changes.

Figure 6:
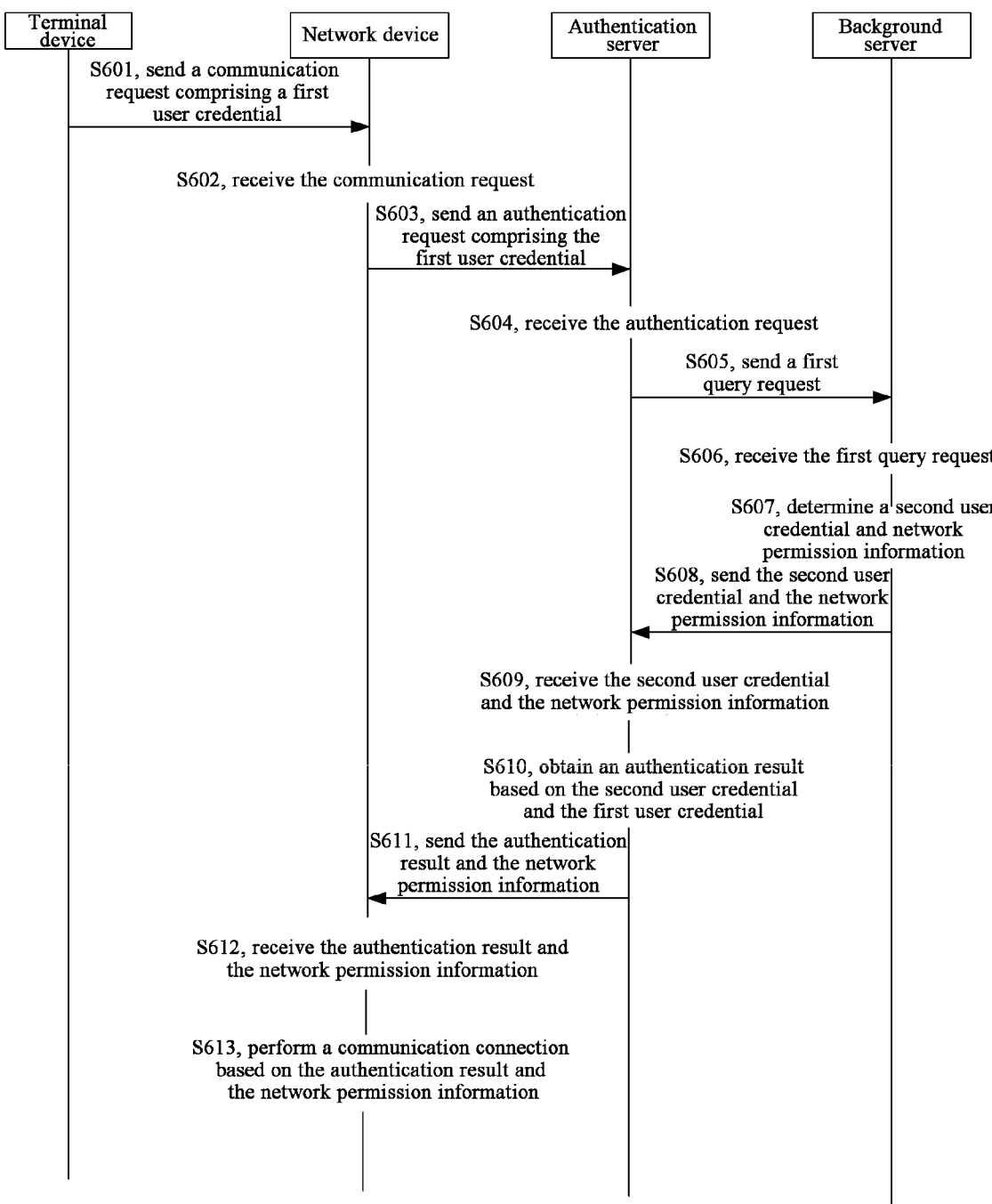
FIG. 6 shows a schematic flowchart of a method for network authentication in accordance with another example embodiment.

FIG. 6 shows a schematic flowchart of a method for network authentication according to a further example embodiment. As shown in FIG. 6, the method for network authentication comprises the following:

S601, a terminal device sends a communication request comprising a first user credential to a network device;
S602, the network device receives the communication request;
S603, the network device sends an authentication request comprising the first user credential to an authentication server;
S604, the authentication server receives the authentication request;

S605, the authentication server sends a first query request to a background server;

S606, the background server receives the first query request;

S607, the background server determines a second user credential and network permission information;

S608, the background server sends the second user credential and the network permission information to the authentication server;

S609, the authentication server receives the second user credential and the network permission information;

S610, the authentication server obtains an authentication result based on the second user credential and the first user credential;

S611, the authentication server sends the authentication result and the network permission information to the network device;

S612, the network device receives the authentication result and the network permission information; and S613, the network device performs a communication connection based on the authentication result and the network permission information.

Here, the detailed implementation process of S601 to S613 may be referred to the related description in the foregoing embodiments and will not be repeated.

Figure 7:
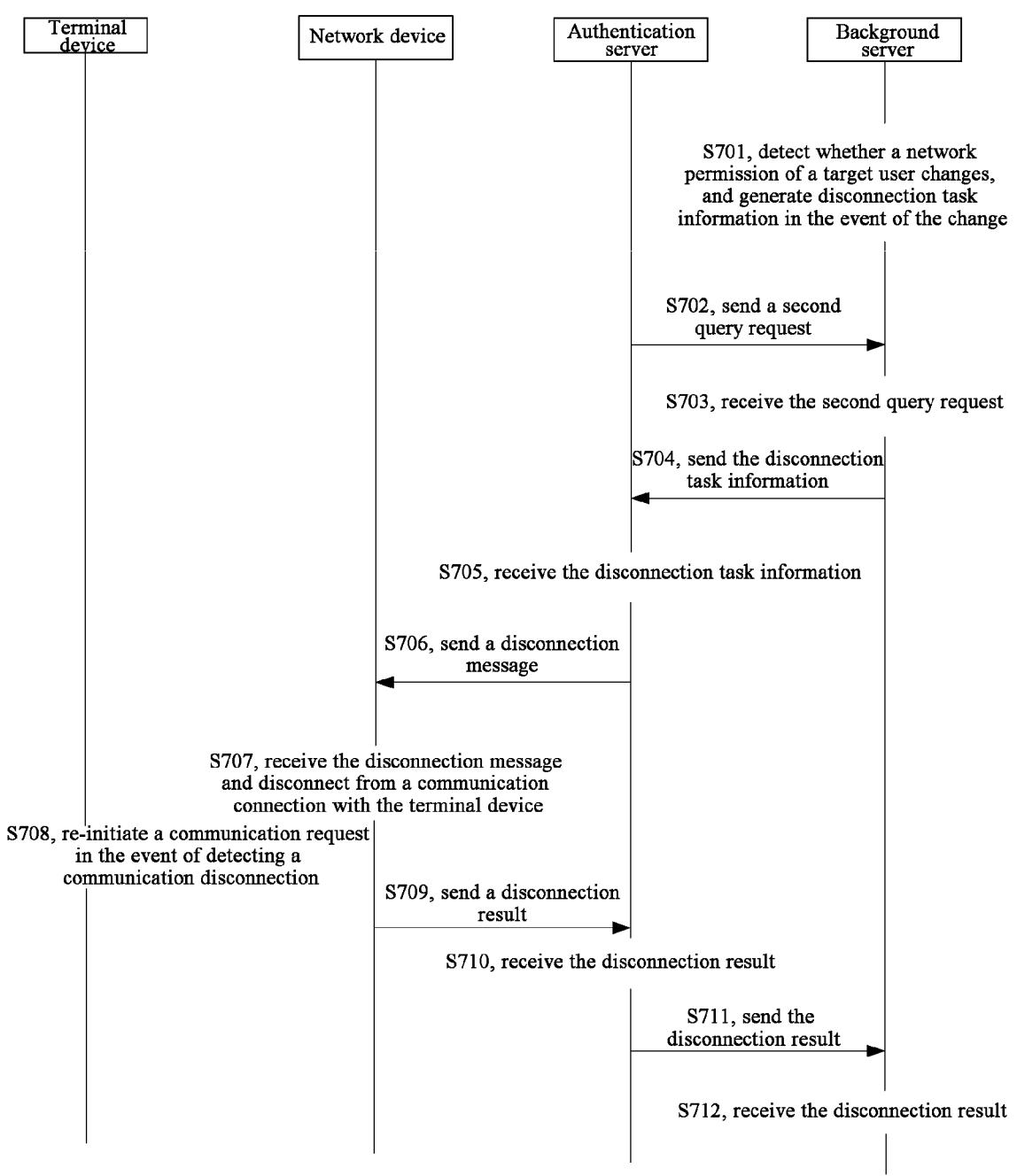
FIG. 7 shows a schematic flowchart of a method for network authentication in accordance with a further example embodiment.

FIG. 7 shows a schematic flowchart of a method for network authentication according to a further example embodiment. As depicted, the method for network authentication comprises the following:

S701, a background server detects whether a network permission of a target user changes or not, and generates disconnection task information in the event of a change;

S702, an authentication server sends a second query request to the background server;

S703, the background server receives the second query request;

S704, the background server sends the disconnection task information to the authentication server;

S705, the authentication server receives the disconnection task information;

S706, the authentication server sends a disconnection message to a network device;

S707, the network device receives the disconnection message and disconnects from a communication connection with a terminal device;

S708, the terminal device re-initiates a communication request in the event of detecting a communication disconnection;

S709, the network device sends a disconnection result to the authentication server;

S710, the authentication server receives the disconnection result;

S711, the authentication server sends the disconnection result to the background server; and S712, the background server receives the disconnection result.

Here, the detailed implementation process of S701 to S712 may be referred to the related description in the foregoing embodiments and will not be repeated. It is noteworthy that the terminal device re-initiating a communication request in the event of detecting a communication disconnection refers to the terminal device re-performing the process as shown in FIG. 6.

Figure 8:
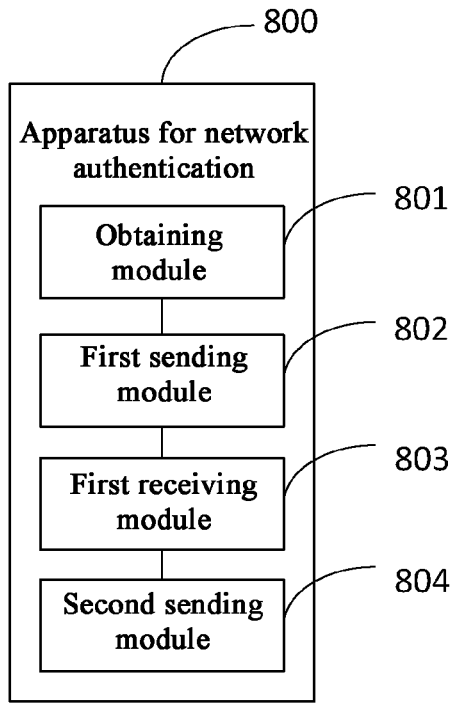
FIG. 8 shows a schematic diagram of module connections of an apparatus for network authentication in accordance with an example embodiment.

FIG. 8 shows a schematic diagram of module connections of an apparatus for network authentication according to an example embodiment. As depicted, an embodiment of the present disclosure provides an apparatus for network authentication being applied to an authentication server, the apparatus 800 comprising:

an obtaining module 801 configured to obtain an authentication request sent by a network device, wherein the authentication request is sent by the network device in response to a communication request sent by a terminal device, the communication request is for requesting to establish a communication connection with the network device, and the authentication request comprises a first user credential of a target user corresponding to the terminal device;

a first sending module 802 configured to send a first query request to a background server in response to the authentication request, wherein the first query request is for causing the background server to determine network permission information and a second user credential of the target user;

a first receiving module 803 configured to obtain an authentication result based on the first user credential and the second user credential in the event of receiving the network permission information and the second user credential of the target user sent by the background server; and a second sending module 804 configured to send the authentication result and the network permission information to the network device in the event that the authentication result characterizes that the authentication is passed, and wherein the authentication result is for causing the network device to establish a communication connection between the network device and the terminal device based on the network permission information.

Optionally, the first query request comprises a user name of the target user, a serial number of the authentication server and an Internet Protocol address of the network device.

Optionally, the apparatus 800 further comprises:

a fourth sending module configured to send a second query request to the background server, wherein the second query request is for causing the background server to send disconnection task information to the authentication server in response to the second query request, and the disconnection task information is generated by the background server in the event of detecting the change in a network permission of the target user; and a third receiving module configured to, in the event of receiving the disconnection task information sent by the background server, send a disconnection message to a network device indicated in the disconnection task information based on the disconnection task information, wherein the disconnection message is for notifying the network device to disconnect from a communication connection with a terminal device indicated in the disconnection message, so as to cause the terminal device to re-initiate, to the network device, a communication connection.

Optionally, the apparatus 800 further comprises:

a fourth receiving module configured to receive a disconnection result sent by the network device in response to the disconnection message, wherein the disconnection result is for characterizing whether the network device successfully disconnects from a communication connection with the terminal device; and a sixth sending module configured to send the disconnection result to the background server in the event of receiving a disconnection result sent by the network device in response to the disconnection message;

wherein the disconnection result is for characterizing whether the network device successfully disconnects from a communication connection with the terminal device; in the event that the disconnection result characterizes that the network device successfully disconnects from the communication connection with the terminal device, the background server is caused to stop sending the disconnection task information to the authentication server; and in the event that the disconnection result characterizes that the network devices fails to successfully disconnect from the communication connection with the terminal device, the background server is caused to continuously send the disconnection task information to the authentication server until preset sending times are reached or the network device successfully disconnects from the communication connection with the terminal device.

Regarding the apparatus 800 in the foregoing embodiment, the specific manner in which each module performs an operation has been described in detail in the embodiments relating to the method, and will not be elaborated herein.

Figure 9:
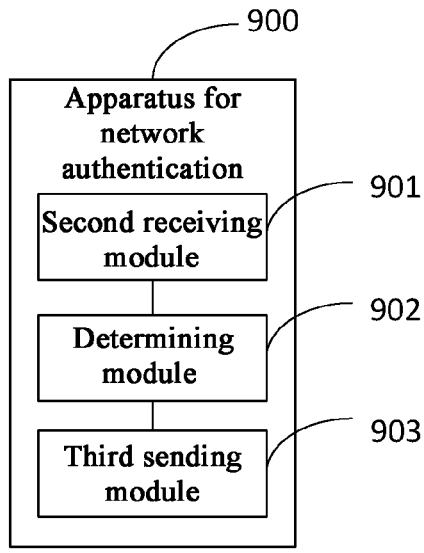
FIG. 9 shows a schematic diagram of module connections of an apparatus for network authentication in accordance with another example embodiment.

FIG. 9 shows a schematic diagram of module connections of an apparatus for network authentication according to another example embodiment. As depicted, an embodiment of the present disclosure provides an apparatus for network authentication, applied to a background server, the apparatus 900 comprising:

a second receiving module 901 configured to receive a first query request sent by an authentication server, wherein the first query request is sent by the authentication server in response to an authentication request sent by a network device, the authentication request is sent by the network device to the authentication server in response to a communication request sent by a terminal device to the network device, the communication request is for requesting to establish a communication connection with the network device, and the authentication request comprises a first user credential of a target user corresponding to the terminal device;

a determining module 902 configured to determine network permission information and a second user credential of the target user in response to the first query request; and a third sending module 903 configured to send the second user credential and the network permission information to the authentication server, wherein the second user credential is for causing the authentication server to obtain an authentication result based on the first user credential and the second user credential, and to send the authentication result and the network permission information to the network device in the event that the authentication result characterizes that the authentication is passed, and the authentication result is for causing the network device to establish a communication connection between the network device and the terminal device based on the network permission information.

Optionally, the first query request comprises a user name of a target user, a serial number of the authentication server and an Internet Protocol address of the network device; and the determining module 902 comprises:

a scenario determining unit configured to determine a network access scenario of the terminal device based on the serial number of the authentication server and the Internet Protocol address of the network device; and a permission determining unit configured to obtain the network permission information based on the network access scenario and the user name of the target user.

Optionally, the permission determining unit comprises:

an assigning unit configured to determine a target virtual local area network to be assigned to the target user based on the user name of the target user in the event that the network access scenario characterizes that virtual local area network resources are used for network accessing; and a permission obtaining unit configured to obtain the network permission information based on the target virtual local area network.

Optionally, the assigning unit is specifically configured to:

determine a hash value corresponding to the user name based on the user name of the target user;

obtain the target virtual local area network by determining, based on the hash value, each virtual local area network in a pool of virtual local area networks which matches the hash value, wherein the pool of virtual local area networks comprises a plurality of virtual local area networks and a range of hash value intervals corresponding to each virtual local area network of the virtual local area networks, and a size of the range of hash value intervals corresponding to each virtual local area network is determined based on a weight which the virtual local area network occupies in the pool of virtual local area networks.

Optionally, the apparatus 900 further comprises:

a first response module configured to send disconnection task information to the authentication server in response to a second query request sent by the authentication server, wherein the disconnection task information is generated by the background server in the event of detecting a change in a network permission of the target user, and the disconnection task information is for causing the authentication server send a disconnection message to a network device indicated in the disconnection task information based on the disconnection task information, and the disconnection message is for notifying the network device to disconnect from a communication connection with a terminal device indicated in the disconnection message, so as to cause the terminal device to re-initiate, to the network device, the communication connection.

Optionally, the apparatus 900 further comprises:

a fifth receiving module configured to receive a disconnection result sent by the authentication server, wherein the disconnection message is sent by the network device to the authentication server in response to the disconnection message, the disconnection result is for characterizing whether the network device successfully disconnects from a communication connection with the terminal device; and a second response module configured to stop sending the disconnection task information to the authentication server in response to the disconnection result, and in the event that the disconnection result characterizes that the network device successfully disconnects from the communication connection with the terminal device, and in the event that the disconnection result characterizes that the network devices fails to successfully disconnect from the communication connection with the terminal device, continuously send the disconnection task information to the authentication server until preset sending times are reached or the network device successfully disconnects from the communication connection with the terminal device.

Regarding the apparatus 900 in the aforementioned embodiments, the specific manner in which each module performs an operation has been described in detail in the embodiments relating to the method, and will not be elaborated herein.

An embodiment of the present disclosure may further provide a system for network authentication, comprising an authentication server as described in the foregoing embodiments, a background server as described in the foregoing embodiments as well as a network device, wherein the network device is communicatively connected with the authentication server, and the authentication server is communicatively connected with the background server.

Figure 10:
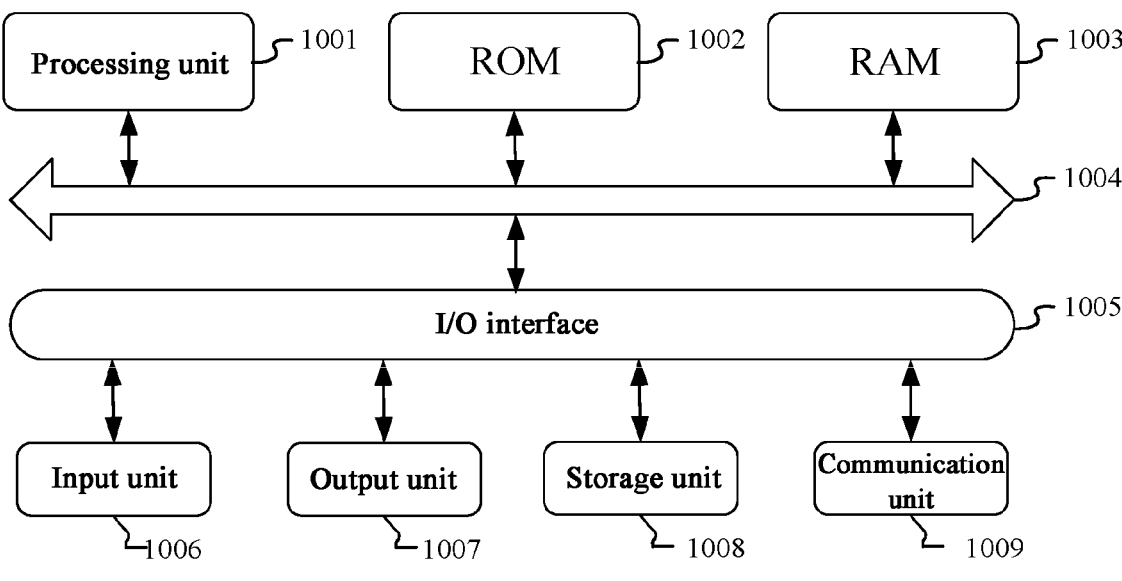
FIG. 10 shows a schematic structure diagram of an electronic device in accordance with an example embodiment.

With reference to FIG. 10 below, this figure shows a schematic structure of an electronic device (e.g., the authentication server or the background server in FIG. 1) 1000 which is applicable to implement the embodiments of the present disclosure. The terminal device in the embodiments of the present disclosure may include, without limitation to, a mobile terminal such as a mobile phone, a notebook computer, a digital broadcast receiver, a PDA (personal digital assistant), a PAD (portable Android device), a PMP (portable multimedia player), an on-board terminal (e.g., an on-board navigation terminal) and the like, and a fixed terminal such as digital TV, a desktop computer and the like. The electronic device shown in FIG. 10 is merely an example and should not be construed as bringing any restriction on the functionality and usage scope of the embodiments of the present disclosure.

As shown in FIG. 10, the electronic device 1000 may comprise a processing unit (e.g., a central processor, a graphics processor) 1001 which is capable of performing various appropriate actions and processes in accordance with programs stored in a read only memory (ROM) 1002 or programs loaded from a storage unit 1008 to a random access memory (RAM) 1003. In the RAM 1003, there are also stored various programs and data required by the electronic device 1000 when operating. The processing unit 1001, the ROM 1002 and the RAM 1003 are connected to one another via a bus 1004. An input/output (I/O) interface 1005 is also connected to the bus 1004.

Usually, the following units may be connected to the I/O interface 1005: an input unit 1006 including a touch screen, a touch pad, a keyboard, a mouse, a camera, a microphone, an accelerometers, a gyroscope, or the like; an output unit 1007, such as a liquid-crystal display (LCD), a loudspeaker, a vibrator, or the like; a storage unit 1008, such as a a magnetic tape, a hard disk or the like; and a communication unit 1009. The communication unit 1009 allows the electronic device to perform wireless or wired communication with other device so as to exchange data with other device. While FIG. 10 shows the electronic device with various units, it should be understood that it is not required to implement or have all of the illustrated units. Alternatively, more or less units may be implemented or exist.

Specifically, according to the embodiments of the present disclosure, the procedures described with reference to the flowchart may be implemented as computer software programs. For example, the embodiments of the present disclosure comprise a computer program product that comprises a computer program embodied on a non-transitory computer-readable medium, the computer program including program codes for executing the method shown in the flowchart. In such an embodiment, the computer program may be loaded and installed from a network via the communication unit 1009, or installed from the storage unit 1008, or installed from the ROM 1002. The computer program, when executed by the processing unit 1001, perform the above functions defined in the method of the embodiments of the present disclosure.

It is to be noted that the computer readable medium of the present disclosure can be a computer readable signal medium, a computer readable storage medium or any combination thereof. The computer readable storage medium may be, for example, but is not limited to, an electronic, magnetic, optical, electromagnetic, infrared or semiconductor system, apparatus or device, or any combination of the foregoing. More specific examples of the computer readable storage medium may include, without limitation to, the following: an electrical connection with one or more conductors, a portable computer diskette, a hard disk, a random access memory (RAM), a read-only memory (ROM), an erasable programmable read-only memory (EPROM or flash memory), an optical fiber, a portable compact disc read-only memory (CD-ROM), an optical storage device, a magnetic storage device, or any suitable combination of the foregoing. In the present disclosure, the computer readable storage medium may be any tangible medium containing or storing a program which may be used by an instruction executing system, apparatus or device or used in conjunction therewith. In the present disclosure, the computer readable signal medium may include a data signal propagated in baseband or as part of a carrier wave, with computer readable program code carried therein. The data signal propagated as such may take various forms, including without limitation to, an electromagnetic signal, an optical signal or any suitable combination of the foregoing. The computer readable signal medium may further be any other computer readable medium than the computer readable storage medium, which computer readable signal medium may send, propagate or transmit a program used by an instruction executing system, apparatus or device or used in conjunction with the foregoing. The program code included in the computer readable medium may be transmitted using any suitable medium, including without limitation to, an electrical wire, an optical fiber cable, RF (radio frequency), etc., or any suitable combination of the foregoing.

In some implementations, the authentication server and the background server may communicate using any network protocol that is currently known or will be developed in future, such as the hyper text transfer protocol (HTTP) and the like, and may be interconnected with digital data communication (e.g., communication network) in any form or medium. Examples of communication networks include local area networks (LANs), wide area networks (WANs), inter-networks (e.g., the Internet) and end-to-end networks (e.g., ad hoc end-to-end networks), as well as any networks that are currently known or will be developed in future.

The above computer readable medium may be included in the above-mentioned electronic device; and it may also exist alone without being assembled into the electronic device.

The computer readable medium carries one or more programs which, when executed by the electronic device, cause the electronic device to: obtain an authentication request sent by a network device, wherein the authentication request is sent by the network device in response to a communication request sent by a terminal device, the communication request is for requesting to establish a communication connection with the network device, and the authentication request comprises a first user credential of a target user corresponding to the terminal device;

send a first query request to a background server in response to the authentication request;

receive network permission information and a second user credential of the target user sent by the background server to the authentication server in response to the first query request;

obtain an authentication result based on the first user credential and the second user credential; and in the event that the authentication result characterizes that the authentication is passed, send the authentication request and the network permission information to the network device, wherein the authentication result is for causing the network device to establish a communication connection between the network device and the terminal device based on the network permission information.

Alternatively, the computer readable medium carries one or more programs which, when executed by the electronic device, cause the electronic device to: receive a first query request sent by an authentication server, wherein the first query request is sent by the authentication server in response to an authentication request sent by a network device, the authentication request is sent by the network device to the authentication server in response to a communication request sent by a terminal device to the network device, the communication request is for requesting to establish the communication connection with the network device, and the authentication request comprises a first user credential of a target user corresponding to the terminal device;

determine network permission information and a second user credential of the target user in response to the first query request; and send the second user credential and the network permission information to the authentication server, wherein the second user credential is for causing the authentication server to obtain an authentication result based on the first user credential and the second user credential, and to send the authentication result and the network permission information to the network device in the event that the authentication result characterizes that the authentication is passed, and the authentication result is for causing the network device to establish a communication connection between the network device and the terminal device based on the network permission information.

Computer program codes for carrying out operations of the present disclosure may be written in one or more programming languages, including without limitation to, an object oriented programming language such as Java, Smalltalk, C++ or the like, and conventional procedural programming languages, such as the "C" programming language or similar programming languages. The program codes may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

The flowchart and block diagrams in the figures illustrate the architecture, functionality, and operation of possible implementations of systems, methods and computer program products according to various implementations of the present disclosure. In this regard, each block in the flowchart or block diagrams may represent a module, segment, or portion of code, which comprises one or more executable instructions for implementing the specified logical function (s). It is also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The modules described in the embodiments of the present disclosure may be implemented as software or hardware. Wherein the name of a module does not form any limitation to the module per se.

The functions described above may be executed, at least in part, by one or more hardware logic components. For example, and without limitation, illustrative types of hardware logic components that can be used include Field-programmable Gate Arrays (FPGAs), Application-specific Integrated Circuits (ASICs), Application-specific Standard Products (ASSPs), System-on-a-chip systems (SOCs), Complex Programmable Logic Devices (CPLDs), etc.

In the context of the present disclosure, the machine readable medium may be a tangible medium, which may include or store a program used by an instruction executing system, apparatus or device or used in conjunction with the foregoing. The machine readable medium may be a machine readable signal medium or a machine readable storage medium. The machine readable medium may include, but is not limited to, an electronic, magnetic, optical, electromagnetic, infrared, semiconductor system, means or device, or any suitable combination of the foregoing. More specific examples of the machine readable storage medium include the following: an electric connection with one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing.

The aforementioned description merely illustrates the preferable embodiments of the present disclosure and used technical principles. Those skilled in the art should understand that the scope of the present disclosure is not limited to technical solutions formed by specific combinations of the foregoing technical features and also cover other technical solution formed by any combinations of the foregoing or equivalent features without departing from the concept of the present disclosure, such as a technical solution formed by replacing the foregoing features with the technical features disclosed in the present disclosure (but not limited to) with similar functions.

In addition, although various operations are depicted in a particular order, this should not be construed as requiring that these operations be performed in the particular order shown or in a sequential order. In a given environment, multitasking and parallel processing may be advantageous. Likewise, although the above discussion contains several specific implementation details, these should not be construed as limitations on the scope of the present disclosure. Certain features that are described in the context of separate embodiments can also be implemented in combination in a single embodiment. Conversely, various features that are described in the context of a single embodiment can also be implemented in multiple embodiments separately or in any suitable subcombination.

Although the subject matter has been described in language specific to structural features and/or method logical acts, it is to be understood that the subject matter defined in the appended claims is not necessarily limited to the specific features or acts described above. On the contrary, the specific features and acts described above are merely example forms of implementing the claims.

I claim:

1. A method for network authentication, being applied to an authentication server, the method comprising:

obtaining an authentication request sent by a network device, wherein the authentication request is sent by the network device in response to a communication request sent by a terminal device, the communication request is for requesting to establish a communication connection with the network device, and the authentication request comprises a first user credential of a target user corresponding to the terminal device;

sending a first query request to a background server in response to the authentication request, wherein the first query request is for causing the background server to determine network permission information and a second user credential of the target user, and wherein the first query request comprises a user name of the target user, a serial number of the authentication server, and an Internet Protocol address of the network device;

in the event of receiving the network permission information and the second user credential of the target user sent by the background server, obtaining an authentication result based on the first user credential and the second user credential; and in the event that the authentication result characterizes that the authentication is passed, sending the authentication result and the network permission information to the network device, wherein the authentication result is for causing the network device to establish the communication connection between the network device and the terminal device based on the network permission information.

2. The method of claim 1, further comprising:

sending a second query request to the background server, wherein the second query request is for causing the background server to send disconnection task information to the authentication server in response to the second query request, and the disconnection task information is generated by the background server in the event of detecting a change in a network permission of the target user; and in the event of receiving the disconnection task information sent by the background server, sending a disconnection message to a network device indicated in the disconnection task information based on the disconnection task information, wherein the disconnection message is for notifying the network device to disconnect from a communication connection with a terminal device indicated in the disconnection message, so as to cause the terminal device to re-initiate, to the network device, a communication connection.

3. The method of claim 2, wherein after sending the disconnection message to the network device indicated in the disconnection task information based on the disconnection task information, the method further comprises:

in the event of receiving a disconnection result sent by the network device in response to the disconnection message, sending the disconnection result to the background server;

wherein the disconnection result is for characterizing whether the network device successfully disconnects from a communication connection with the terminal device, and in the event that the disconnection result characterizes that the network device successfully disconnects from the communication connection with the terminal device, causing the background server to stop sending the disconnection task information to the authentication server; in the event that the disconnection result characterizes that the network devices fails to successfully disconnect from the communication connection with the terminal device, causing the background server to continuously send the disconnection task information to the authentication server until preset sending times are reached or the network device successfully disconnects from the communication connection with the terminal device.

4. A method for network authentication, being applied to a background server, the method comprising:

receiving a first query request sent by an authentication server, wherein the first query request is sent by the authentication server in response to an authentication request sent by a network device, and wherein the first query request comprises a user name of a target user, a serial number of the authentication server, and an Internet Protocol address of the network device, the authentication request is sent by the network device to the authentication server in response to a communication request sent by a terminal device to the network device, the communication request is for requesting to establish a communication connection with the network device, and the authentication request comprises a first user credential of a target user corresponding to the terminal device;

determining network permission information and a second user credential of the target user in response to the first query request; and sending the second user credential and the network permission information to the authentication server, wherein the second user credential is for causing the authentication server to obtain an authentication result based on the first user credential and the second user credential, and to send the authentication result and the network permission information to the network device in the event that the authentication result characterizes that the authentication is passed, and wherein the authentication result is for causing the network device to establish a communication connection between the network device and the terminal device based on the network permission information.

5. The method of claim 4, wherein determining the network permission information of the target user in response to the first query request comprises:

determining a network access scenario of the terminal device based on the serial number of the authentication server and the Internet Protocol address of the network device; and obtaining the network permission information based on the network access scenario and the user name of the target user.

6. The method of claim 5, wherein obtaining the network permission information based on the network access scenario and the user name of the target user comprises:

in the event that the network access scenario characterizes that virtual local area network resources are used for network accessing, determining a target virtual local area network to be assigned to the target user based on the user name of the target user; and obtaining the network permission information based on the target virtual local area network.

7. The method of claim 6, wherein determining the target virtual local area network to be assigned to the target user based on the user name of the target user comprises:

determining a hash value corresponding to the user name based on the user name of the target user; and obtaining the target virtual local area network by determining, based on the hash value, a virtual local area network in a pool of virtual local area networks which matches the hash value, wherein the pool of virtual local area networks comprises a plurality of virtual local area networks and a range of hash value intervals corresponding to each virtual local area network, and wherein a size of the range of hash value intervals corresponding to each virtual local area network is determined based on a weight which the virtual local area network occupies in the pool of virtual local area networks.

8. The method of claim 4, further comprising:

sending disconnection task information to the authentication server in response to a second query request sent by the authentication server, wherein the disconnection task information is generated by the background server in the event of detecting a change in a network permission of the target user, and the disconnection task information is for causing the authentication server to send a disconnection message to a network device indicated in the disconnection task information based on the disconnection task information, and the disconnection message is for notifying the network device to disconnect from a communication connection with a terminal device indicated in the disconnection message, so as to cause the terminal device to re-initiate, to the network device, a communication connection.

9. The method of claim 8, further comprising:

receiving a disconnection result sent by the authentication server, wherein the disconnection message is sent by the network device to the authentication server in response to the disconnection message, and the disconnection result is for characterizing whether the network device successfully disconnects from a communication connection with the terminal device; and in response to the disconnection result, in the event that the disconnection result characterizes that the network device successfully disconnects from the communication connection with the terminal device, stopping sending the disconnection task information to the authentication server, and in the event that the disconnection result characterizes that the network devices fails to successfully disconnect from the communication connection with the terminal device, continuously sending the disconnection task information to the authentication server until preset sending times are reached or the network device successfully disconnects from the communication connection with the terminal device.

10. A system comprising an authentication server and a background server, wherein:

the authentication server comprises a processor; and a memory coupled to the processor and having instructions stored therein, wherein the instructions, when executed by the processor, cause the authentication server to perform first actions comprising:

obtaining an authentication request sent by a network device, wherein the authentication request is sent by the network device in response to a communication request sent by a terminal device, the communication request is for requesting to establish a communication connection with the network device, and the authentication request comprises a first user credential of a target user corresponding to the terminal device;

sending a first query request to a background server in response to the authentication request, wherein the first query request is for causing the background server to determine network permission information and a second user credential of the target user, and wherein the first query request comprises a user name of the target user, a serial number of the authentication server, and an Internet Protocol address of the network device;

in the event of receiving the network permission information and the second user credential of the target user sent by the background server, obtaining an authentication result based on the first user credential and the second user credential; and in the event that the authentication result characterizes that the authentication is passed, sending the authentication result and the network permission information to the network device, wherein the authentication result is for causing the network device to establish the communication connection between the network device and the terminal device based on the network permission information, and wherein the background server comprises a processor; and a memory coupled to the processor and having instructions stored therein, wherein the instructions, when executed by the processor, cause the background server to perform second actions comprising:

receiving a first query request sent by an authentication server, wherein the first query request is sent by the authentication server in response to an authentication request sent by a network device, the authentication request is sent by the network device to the authentication server in response to a communication request sent by a terminal device to the network device, the communication request is for requesting to establish a communication connection with the network device, and the authentication request comprises a first user credential of a target user corresponding to the terminal device;

determining network permission information and a second user credential of the target user in response to the first query request; and sending the second user credential and the network permission information to the authentication server, wherein the second user credential is for causing the authentication server to obtain an authentication result based on the first user credential and the second user credential, and to send the authentication result and the network permission information to the network device in the event that the authentication result characterizes that the authentication is passed, and wherein the authentication result is for causing the network device to establish a communication connection between the network device and the terminal device based on the network permission information.

11. The system of claim 10, the first actions further comprising:

sending a second query request to the background server, wherein the second query request is for causing the background server to send disconnection task information to the authentication server in response to the second query request, and the disconnection task information is generated by the background server in the event of detecting a change in a network permission of the target user; and in the event of receiving the disconnection task information sent by the background server, sending a disconnection message to a network device indicated in the disconnection task information based on the disconnection task information, wherein the disconnection message is for notifying the network device to disconnect from a communication connection with a terminal device indicated in the disconnection message, so as to cause the terminal device to re-initiate, to the network device, a communication connection.

12. The system of claim 11, wherein after sending the disconnection message to the network device indicated in the disconnection task information based on the disconnection task information, the first actions further comprises:

in the event of receiving a disconnection result sent by the network device in response to the disconnection message, sending the disconnection result to the background server;

wherein the disconnection result is for characterizing whether the network device successfully disconnects from a communication connection with the terminal device, and in the event that the disconnection result characterizes that the network device successfully disconnects from the communication connection with the terminal device, causing the background server to stop sending the disconnection task information to the authentication server; in the event that the disconnection result characterizes that the network devices fails to successfully disconnect from the communication connection with the terminal device, causing the background server to continuously send the disconnection task information to the authentication server until preset sending times are reached or the network device successfully disconnects from the communication connection with the terminal device.

13. The system of claim 10, wherein the first query request comprises a user name of a target user, a serial number of the authentication server, and an Internet Protocol address of the network device;

wherein determining the network permission information of the target user in response to the first query request comprises:

determining a network access scenario of the terminal device based on the serial number of the authentication server and the Internet Protocol address of the network device; and obtaining the network permission information based on the network access scenario and the user name of the target user.

14. The system of claim 13, wherein obtaining the network permission information based on the network access scenario and the user name of the target user comprises:

in the event that the network access scenario characterizes that virtual local area network resources are used for network accessing, determining a target virtual local area network to be assigned to the target user based on the user name of the target user; and obtaining the network permission information based on the target virtual local area network.

15. The system of claim 14, wherein determining the target virtual local area network to be assigned to the target user based on the user name of the target user comprises:

determining a hash value corresponding to the user name based on the user name of the target user; and obtaining the target virtual local area network by determining, based on the hash value, a virtual local area network in a pool of virtual local area networks which matches the hash value, wherein the pool of virtual local area networks comprises a plurality of virtual local area networks and a range of hash value intervals corresponding to each virtual local area network, and wherein a size of the range of hash value intervals corresponding to each virtual local area network is determined based on a weight which the virtual local area network occupies in the pool of virtual local area networks.

16. The system of claim 10, the second actions further comprising:

sending disconnection task information to the authentication server in response to a second query request sent by the authentication server, wherein the disconnection task information is generated by the background server in the event of detecting a change in a network permission of the target user, and the disconnection task information is for causing the authentication server to send a disconnection message to a network device indicated in the disconnection task information based on the disconnection task information, and the disconnection message is for notifying the network device to disconnect from a communication connection with a terminal device indicated in the disconnection message, so as to cause the terminal device to re-initiate, to the network device, a communication connection.

17. The system of claim 16, the second actions further comprising:

receiving a disconnection result sent by the authentication server, wherein the disconnection message is sent by the network device to the authentication server in response to the disconnection message, and the disconnection result is for characterizing whether the network device successfully disconnects from a communication connection with the terminal device.

18. The system of claim 17, the second actions further comprising:

in response to the disconnection result, in the event that the disconnection result characterizes that the network device successfully disconnects from the communication connection with the terminal device, stopping sending the disconnection task information to the authentication server, and in the event that the disconnection result characterizes that the network devices fails to successfully disconnect from the communication connection with the terminal device, continuously sending the disconnection task information to the authentication server until preset sending times are reached or the network device successfully disconnects from the communication connection with the terminal device.

* * * * *